(12) United States Patent
Young et al.

(10) Patent No.: US 6,983,599 B2
(45) Date of Patent: Jan. 10, 2006

(54) COMBUSTOR MEMBER AND METHOD FOR MAKING A COMBUSTOR ASSEMBLY

(75) Inventors: Craig Douglas Young, Maineville, OH (US); Bangalore Aswatha Nagaraj, West Chester, OH (US); Dane Anthony Elliott-Lewis, Cincinnati, OH (US); Joshua Leigh Miller, West Chester, OH (US); Kevin Swayne O'Hara, Boxford, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/777,567

(22) Filed: Feb. 12, 2004

(65) Prior Publication Data

US 2005/0178126 A1    Aug. 18, 2005

(51) Int. Cl.
*F23R 3/14* (2006.01)
(52) U.S. Cl. .................. 60/722; 60/748; 29/890.01
(58) Field of Classification Search .............. 60/722, 60/748, 752; 29/890.01, 889.2
See application file for complete search history.

(56) References Cited

U.S. PATENT DOCUMENTS

| | | | |
|---|---|---|---|
| 4,302,940 A | * | 12/1981 | Meginnis ................. 60/754 |
| 4,897,315 A | | 1/1990 | Gupta |
| 5,117,624 A | | 6/1992 | Roberts, Jr. et al. |
| 5,289,687 A | | 3/1994 | Kress et al. |
| 5,355,668 A | | 10/1994 | Weil et al. |
| 5,682,747 A | * | 11/1997 | Brown et al. ............ 60/746 |
| 5,771,577 A | | 6/1998 | Gupta et al. |
| 6,321,449 B2 | * | 11/2001 | Zhao et al. ............ 29/890.01 |
| 6,468,040 B1 | * | 10/2002 | Grylls et al. ............. 416/224 |
| 6,499,949 B2 | * | 12/2002 | Schafrik et al. ........ 416/97 R |
| 6,616,410 B2 | * | 9/2003 | Grylls et al. ............ 416/224 |
| 6,842,980 B2 | * | 1/2005 | Young et al. ........... 29/889.2 |
| 2004/0011044 A1 | * | 1/2004 | Young et al. .............. 60/752 |
| 2005/0081528 A1 | * | 4/2005 | Howell et al. ............ 60/748 |

* cited by examiner

*Primary Examiner*—Ehud Gartenberg
(74) *Attorney, Agent, or Firm*—William Scott Andes; Lee H. Sachs

(57) ABSTRACT

A turbine engine combustor member, for example a deflector including an inner surface at a combustor interior and an outer surface away from such interior includes a body of a high temperature alloy having properties combining resistance to hot corrosion in March=1 flows and oxidation to avoid coating the outer surface. In one embodiment, the inner surface includes an environmental resistant coating comprising a ceramic-base thermal barrier coating. In some forms such coating includes an inner coating including Al under the ceramic-base coating. In another embodiment, the member includes air cooling passages and is substantially uncoated. Provision of such a member enables complete combustor assembly including a plurality of members and then coating all inner surfaces concurrently rather than individually before assembly.

20 Claims, 3 Drawing Sheets

COMBUSTOR MEMBER AND METHOD FOR MAKING A COMBUSTOR ASSEMBLY

BACKGROUND OF THE INVENTION

This invention relates generally to turbine engine combustors and, more particularly, to turbine engine combustor members including an inner surface exposed directly to the combustor interior and the combustion of fuel.

During operation of a turbine engine, for example a gas turbine engine, ambient air flows into a compressor that discharges compressed air to a combustor of a combustion system. A mixture of the compressed air and fuel is ignited in the combustor to provide pressurized combustion products to a downstream turbine system that extracts energy from the combustion products for a designed operation of the engine. A variety of turbine engine combustion systems and components have been reported, for example in U.S. Pat. No. 5,117,624—Roberts, Jr. et al.; U.S. Pat. No. 5,289,687—Kress et al.; and U.S. Pat. No. 5,355,668—Weil et al.

As is well known in the gas turbine engine art, temperatures as a result of such combustion within the interior of the combustor can be as high as about 3000° F. In addition, because of the presence of oxygen in a rapidly flowing fluid stream, inner surfaces of combustor members exposed to the combustion of fuel and compressed air are subject to very strenuous high temperature hot corrosion and oxidizing conditions. Examples of such combustor members include those referred to in the art as deflectors (sometimes called splash plates, baffles or heat shields), center bodies, swirl cups, and combustor liners and liner segments, each including a surface exposed to the combustor interior in which combustion occurs during operation. Because of such operating conditions, it has been a practice to manufacture combustor members, that include at least one inner surface exposed to such temperatures and conditions, from alloys having high temperature resistant properties and to coat such inner surfaces with a high temperature environmental resistant coating or coating system. Sometimes cooling air is applied to or through members to reduce operating temperatures of the members. Typically, some of such combustor members have been coated individually and then assembled with other associated components into a combustor.

One example of a combustor member of particular interest is a deflector mounted to an axially forward dome structure through which compressed air and fuel are introduced into the combustor. The deflector is mounted to the dome structure hot or interior side to provide a barrier or heat shield from hot gas radiation and convection. Fuel discharging to the combustion zone from a swirler cup exit or flare often films along deflector faces resulting in stagnation or recirculation zones at deflector outer edges. High fuel-air ratios in such recirculation zones can hold a combustion flame on the deflector edges. This can result in local gas temperatures sufficiently high to cause rapid oxidation or melting of the deflector edges as well as to provide an environment conducive to hot corrosion on other surfaces of the deflector. Similar results have been observed on another example of a combustor member called a hollow center body that acts to partially define inner and outer annular combustor portions in one form of an annular combustor system.

Environmental protective coating combinations that have been applied to surfaces of combustor members exposed to such conditions include an inner or bond coating of a well known and widely reported MCrAl-type base material in which the M represents at least one of the elements Fe, Co, and Ni. Such base materials have been reported to include additional elements such as at least one of Y, Hf, Pt, Rh, Si, Zr, and others. One typical example is a NiCrAlY coating. U.S. Pat. No. 4,897,315—Gupta presents some background and examples of knowledge of MCrAl-type coating materials. It has been a practice to use an MCrAl-type coating as a bond coat for an outer ceramic-base thermal barrier coating (TBC) one form of which is a coating based on zirconia stabilized with about 3–20 weight % yttria, typically, by weight, about 92% zirconia stabilized with about 8% yttria. This general type of coating system is discussed in such U.S. Patents as U.S. Pat. No. 5,771,577—Gupta et al. One manufacturing advantage of use of such coating combination is that the bond coat and outer ceramic TBC can be applied by a commercially available method called Air Plasma Spray (APS).

Another more costly protective coating system that has been applied to combustor members is an aluminide diffused with Pt to provide a PtAl inner coating. The above-described TBC then has been deposited over the PtAl coating by electron beam plasma vapor deposition (EB-PVD). Current deflectors are coated individually on at least one surface, including inner surfaces exposed to combustion of fuel, and sometimes on outer surfaces away from the combustor interior before assembly. Therefore, a PtAl/TBC type of coating has been used in combination with an advanced high temperature alloy having good high temperature oxidation resistance to provide a component with enhanced operating performance.

Provision of a combustor component, for example a deflector, made of an improved high temperature alloy having not only good oxidation resistance but also excellent, improved hot corrosion resistance requires, at most, application of a high temperature environmental coating only to surfaces exposed to a combustor interior. This can enable assembly of the component with other members of a combustor prior to coating and then coating, with any appropriate masking, of the entire assembly rather than of individual components. Such a combination of materials and processes enhances operating performance of the combustor while reducing manufacturing cost.

BRIEF SUMMARY OF THE INVENTION

The present invention, in one form, provides a turbine engine combustor member, disposed at a combustor interior, and including at least one surface exposed directly to combustion of fuel within the combustor interior. The member comprises a member body made of an alloy based on at least one of Fe, Co, and Ni. The alloy has an alloy high temperature operating capability within the range of about 1300–2300° F. and properties comprising a combination of resistance to hot corrosion as well as to oxidation within such temperature range. The alloy hot corrosion resistance is defined and measured by a depth of attack on an alloy surface of less than 0.01 inch, after exposure to about 2 parts per million sea salt in a gaseous medium, cycled in a temperature range of about 1500–1700° F. for about 1000 hours in a burner test rig commonly used in the art. The alloy oxidation resistance is defined and measured by an alloy surface loss of less than 0.001 inch after cyclic testing for about 120 hours in an oxidizing gas stream, for example typical products of gas turbine fuel combustion, at a velocity of about Mach 1 for about 20 cycles per hour from ambient to about 2150° F. The member body includes a member body inner first surface generally facing and exposed to the combustor interior and the combustion of fuel, and a member body outer second surface generally facing away from and not exposed directly to the combustor interior.

In one embodiment, the member body includes a high temperature environmental resistant coating system comprising a ceramic-base thermal barrier coating disposed on the member body inner first surface. The member body outer second surface is substantially uncoated. In one form, this embodiment includes an inner or bond coating including Al disposed on the member body inner first surface and the ceramic-base thermal barrier coating disposed on the inner coating.

In another embodiment, the member body substantially is uncoated and includes therethrough a plurality of air cooling passages extending from a member body inner surface to a member body outer surface.

In a method form of the present invention, a plurality of the above-described turbine engine combustor members is provided with uncoated body surfaces and assembled into a combustor. Then the member body inner first surfaces of the assembled combustor chamber members are coated substantially concurrently with a high temperature environmental resistant coating using an air spray method that applies the coating to the assembled member body inner first surfaces.

DETAILED DESCRIPTION OF THE INVENTION

Figure 1:
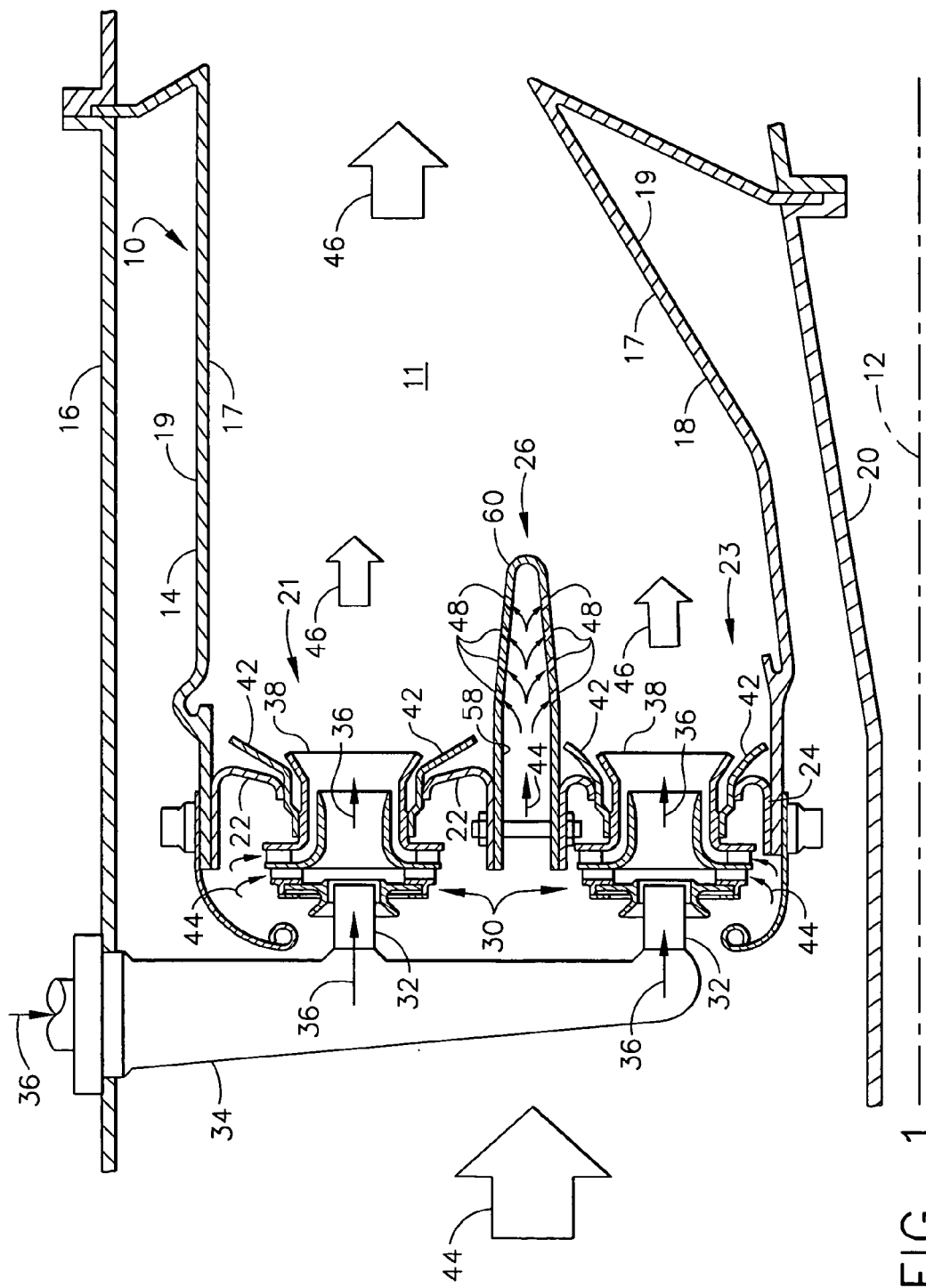
FIG. 1 is a fragmentary sectional view along a turbine engine longitudinal axis of a double dome annular combustor including radially inner and outer fuel and compressed air supply assemblies.

The fragmentary sectional view of FIG. 1 shows, generally at 10, a portion of one form of a gas turbine engine combustor assembly, sometimes called a combustor, for example of a type used in such engines designed to power aircraft. However, the present invention can be practiced with other types of combustor assemblies as well. Combustor 10, having a combustor interior 11, has been constructed to comprise an annular double dome structure disposed circumferentially about engine axis 12. Combustor 10 included annular outer combustor liner 14, supported by outer engine casing 16, and annular inner combustor liner 18, spaced radially inwardly from outer combustor liner 14 and supported by annular inner engine casing 20. Combustor liners 14 and 18 include inner surfaces 17 facing and exposed to combustor interior 11, and outer surfaces 19 not exposed to combustor interior 11. Some forms of combustor liners 14 and 18 are segmented; some are air cooled, with cooling air passages or holes therethrough. Outer liner 14 was connected to a radially outer dome structure shown generally at 21 through outer dome support 22. Similarly, inner liner 18 was connected to a radially inner dome structure shown generally at 23 through inner dome support 24. A typical annular hollow center body shown generally at 26 was joined though supports 22 and 24 between outer dome structure 21 and inner dome structure 23.

Figure 2:
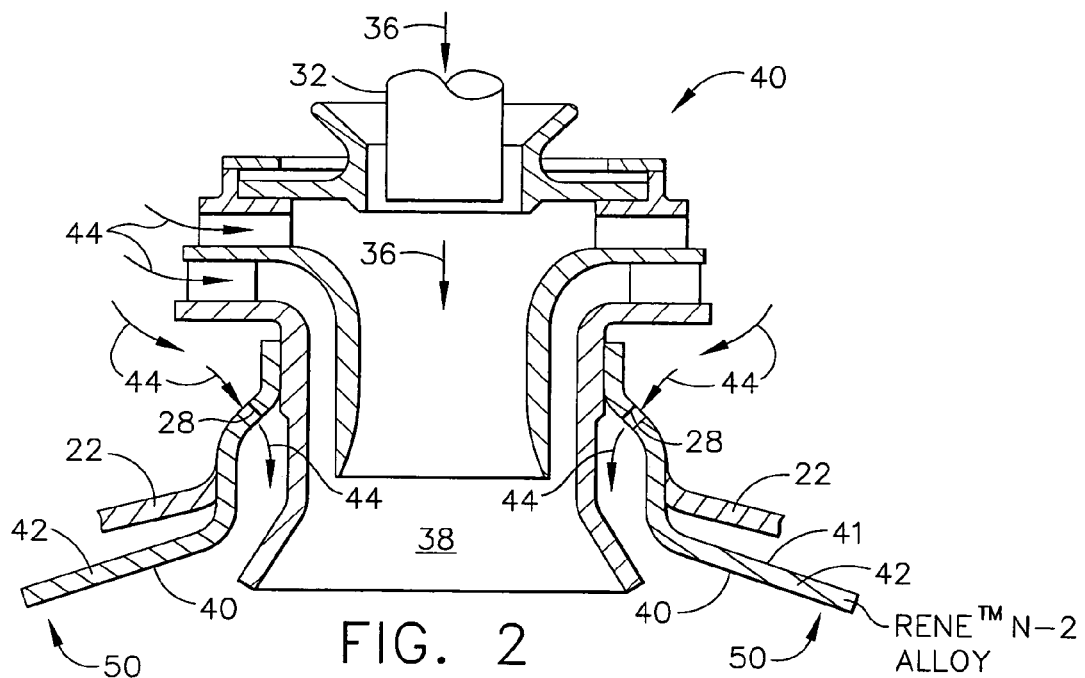
FIG. 2 is an enlarged fragmentary sectional view of the radially outer fuel and compressed air supply assemblies of FIG. 1.
Figure 3:
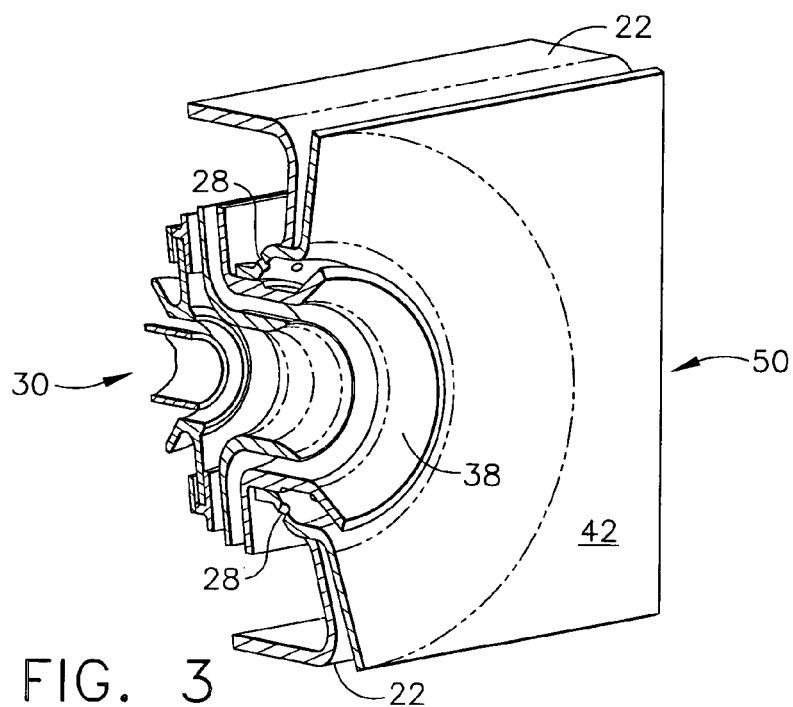
FIG. 3 is a fragmentary perspective of the assembly of FIG. 2.

Each dome structure 21 and 23 included a plurality of circumferentially spaced-apart carburetors shown generally at 30, carried by dome supports 22 and 24, disposed in inner and outer circumferential arrays through which compressed air and fuel were injected and mixed for ignition in interior 11 of combustor 10. In this embodiment, carburetors 30 for convenience are shown to be generally the same although they can differ by appropriate design sizing. Each carburetor 30 included a fuel injector nozzle 32 extending from a fuel supply stem 34 which was supported by and extended generally radially inwardly from outer casing 16 and provided fuel for discharge from nozzles 32. Also, each carburetor 30 included a flared swirler or swirler cup 38 to which deflector bodies 42 were connected in this embodiment. As shown in detail in FIGS. 2 and 4, deflector bodies 42 included a body first inner surface 40 generally facing and exposed to combustor interior 11, and body outer second surface 41 generally facing away from and not directly exposed to combustor interior 11. Deflector bodies 42 were carried respectively by outer and inner liners 14 and 18 through supports 22 and 24. Pressurized air 44, which was compressed in an axially forward compressor (not shown), was provided for the combustion process in the combustor as well as for cooling of members of the combustor, for example by passage of flare air cooling through cooling holes 28 adjacent deflector 42 in FIGS. 2 and 4 and cooling holes 48 in center body 26 in FIG. 1. For such combustion, air 44 was passed through swirlers 38 and is mixed with fuel 36 from fuel nozzles 32 to provide a preselected fuel/air mixture for ignition by typical igniters (not shown) and combustion in domes 21 and 23. Such combustion generated gaseous products of combustion 46 discharged axially from combustor 10. The fragmentary sectional view of FIG. 2 is an enlarged detailed view of one carburetor 30 in outer dome structure 12, with FIG. 3 providing a fragmentary sectional perspective view of the carburetor 30, deflector 42 and associated structure of FIG. 2.

The combustor dome structure such as dome supports 22 and 24 must be protected from intense heat generated during the combustion process. Accordingly, deflectors 42 were positioned within the hot side of the dome structure including deflector inner first surfaces 40 facing, meaning generally directed toward, and exposed to the combustion of the fuel/air mixture in combustor interior 11 to provide a barrier from hot gas radiation and convection. Fuel 36 discharging to the combustion zone from flared swirlers 38 has been recognized to form films along deflector inner first surfaces 40 resulting in stagnation or recirculation zones at deflector first surface edge portions shown generally at 50. High fuel/air ratios at edge portions 50 can hold a combustion flame on edge portions 50, resulting in local temperatures high enough to result in rapid oxidation or melting of deflector edge portions 50, and an environment conducive to hot corrosion of other surfaces of deflector inner first surface 40. Similar oxidation and/or hot corrosion distress has been observed on other combustor members such as center body 26.

In some previously used forms of such combustors, deflector bodies 42 have been made of high temperature Ni base superalloys coated on inner first surface 40 before assembly with an environmental resistant coating system, of a type as was described above, and then assembled as in the drawings. One example is a deflector body 42 made of commercially available Mar M509 alloy coated on surface 40 with a system of air plasma sprayed (APS) NiCrAlY alloy as a bond coat on surface 40 that then was coated with the APS TBC described. Another example of a previously used improved combination is a deflector body 42 made of Rene™ N5 Ni base superalloy, forms of which are described in more detail in U.S. Pat. Nos. 5,173,255 and 6,074,602, coated on surface 40 with the above described PtAl/ EB-PVD TBC system before assembly. Such coating systems, that have been applied to increase member durability while improving engine efficiency by enabling increase in engine operating temperatures, generally have performed well in service. However, in certain applications, an improved combination of structural alloy and coating system is desirable to achieve greater temperature-thermal cycle time capability, for longer service intervals or higher temperature operation. In addition, use of a coating system that enables assembly of the combustor members prior to coating can significantly reduce manufacturing costs.

According to a form of the present invention, the body of a combustor member such as deflector body 42 was made of a high temperature resistant alloy having improved, excellent hot corrosion resistance along with good high temperature oxidation resistance. Such body was coated on inner first surface 40 with a high temperature environmentally resistant coating. In one example, a ceramic-base thermal barrier coating can be disposed on inner first surface 40. In another example, an inner coating including Al was disposed on inner first surface 40 and a ceramic-base thermal barrier coating was disposed as an outer coating on the inner coating including Al to provide a coating system. The high temperature resistant alloy has an alloy high temperature capability within the range of about 1300–2300° F. along with properties comprising a hot corrosion resistance defined and measured by a depth of attack on an alloy surface of less than about 0.01 inches, after exposure to about 2 parts per million sea salt in a gaseous medium, cycled in the temperature range of about 1500–1700° F. for about 1000 hours in a burner rig commonly used in the art. In combination with such hot corrosion resistance, the alloy includes the property of oxidation resistance defined and measured by an alloy surface loss of less than about 0.001 inch after cyclic testing for about 120 hours in an oxidizing gas stream, for example products of combustion of gas turbine engine fuel, at a velocity of about Mach 1 for about 20 cycles per hour from ambient about 2150° F. Examples of such an alloy are high Ni base superalloys, some forms of which have been referred to as Rene™ N-2 alloy, more fully described in co-pending patent application Ser. No. 10/314,083—O'Hara et al., filed Dec. 6, 2002 and assigned to the assignee of the present invention. Such a Ni base alloy comprises, in weight percent, from about 1 to about 3 rhenium, from about 6 to about 9 aluminum, from about 4 to about 6 tantalum, from about 12.5 to about 15 chromium, from about 3 to about 10 cobalt, and from about 2 to about 5 tungsten, with the balance essentially Ni and impurities. In some forms, such alloy includes smaller amounts of elements such as titanium, hafnium, silicon, molybdenum and/or niobium in amounts, in weight percent from 0 up to about 1.

Certain currently used high temperature Ni base superalloys such as the above identified Rene™ N-5 alloy are recognized for their outstanding strength and oxidation resistance capability above 2000° F. However, their hot corrosion resistance is less than desirable for certain high temperature strenuous environmental conditions such as are found in portions of combustor interiors. For example, in the above-described hot corrosion tests using a gaseous medium, such as combustion gases, including 2 parts per million of sea salt on specimens cycled at one hour cycles between 1500° F. and 1650° F. for a total of 1039 hours, Rene™ N-2 alloy specimens exhibited a total attack depth of less than 0.01 inch per side, at a total attack of 0.002 inch per side. The performance of Rene™ N-5 alloy could not be measured in this test because it was corroded completely through and was completely destroyed in 350 hours, indicating 0.065 inch of attack per side at that point in the test. The oxidation resistance of these two alloys, when tested according to the above-described Mach 1 cyclic oxidation test, were substantially the same, exhibiting an alloy surface loss of less than 0.001 inch. Accordingly, forms of the present invention providing a turbine engine combustor member include use of an alloy having the recited improved combination of properties for the member body. In a more specific form, the member body is made of the above-identified Rene™ N-2 alloy.

Figure 4:
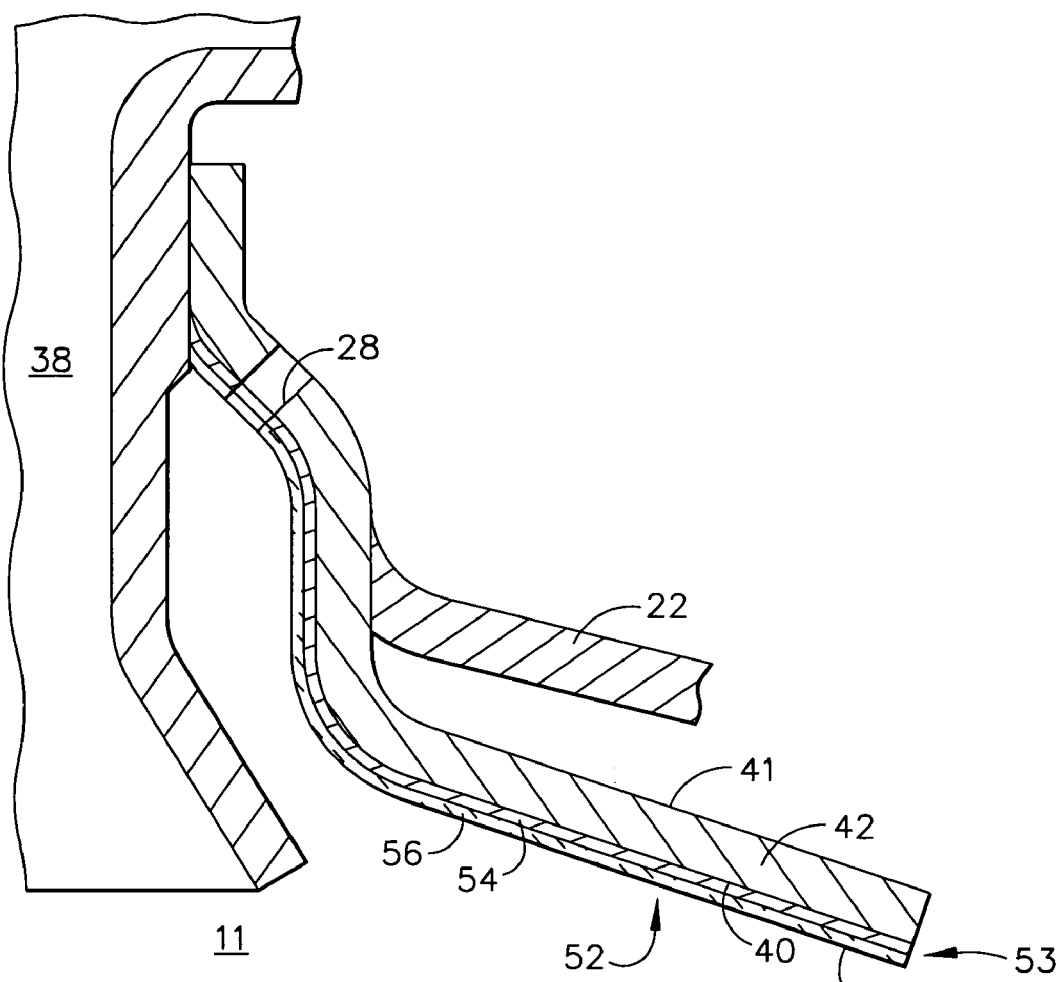
FIG. 4 is an enlarged fragmentary sectional view of a portion of FIG. 2 showing a coated combustor deflector member.

An embodiment of the present invention, for example as described in the drawings, was a combustor member having a body made of an alloy including the above-defined properties in combination with a particular type of coating system on an inner first surface generally facing a combustor interior. An outer second surface generally facing away from and not directly exposed to the combustor interior was substantially uncoated. The coating system on the body inner first surface comprised an inner coating including Al and an outer ceramic-base thermal barrier coating disposed on the inner coating. Such a combination is shown in the enlarged fragmentary sectional view of FIG. 4, showing a portion of FIG. 2. Coated combustor deflector member shown generally at 52 in FIG. 4 comprised body 42 including inner first surface 40 generally facing and exposed to combustor interior 11, and outer second surface 41 generally facing away from and not directly exposed to combustor interior 11. Disposed on inner first surface 40 was a high temperature environmental resistant coating shown generally at 53, for example a coating system comprising inner coating 54 and outer coating 56 disposed on inner coating 54. Inner coating 54 was a metallic coating including Al. In a preferred form, inner coating 54 was of the above-described MCrAl-type, one form of which was NiCrAlY alloy, that can be and was deposited by APS. Outer coating 56 was a ceramic-based thermal barrier coating, one form of which was the above-described zirconia base TBC that can be applied by APS.

It has been observed that such combination of alloy body and coating system combination provides a combustor member, such as coated deflector 52, or a combustor liner such as 14 and 18 coated on liner inner surfaces 62, with greater performance, durability, and repair capability at a lower cost compared with a similar current member. Use of a combination of inner and outer coatings that can be applied by APS has enabled assembly of combustor members prior to subsequent substantially concurrent coating of inner surfaces of selected members.

Figure 5:
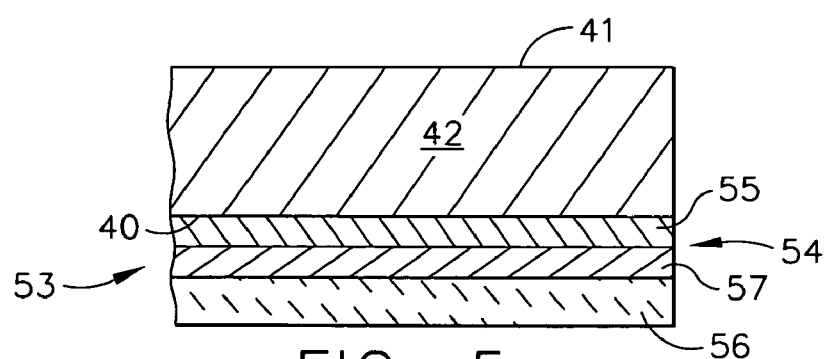
FIG. 5 is an enlarged fragmentary sectional view of a portion of FIG. 4.

Another form of inner coating 54 for receiving an outer TBC is a two-layer coating shown in the fragmentary sectional view of FIG. 5 showing a portion of coated deflector 52 of FIG. 4. In that embodiment, coating 54 includes a first or inner layer 57 of a dense microstructure and a second or outer layer 57 providing a rough surface to enhance adhesion of outer TBC coating 56. In one example, the first or inner layer 55 has a first density in the range of about 90–100% and a first surface roughness in the range of about 50–200 microinches. The second or outer layer 57, disposed on the first or inner layer 55, has a second density in the range of about 60–90% and a second surface roughness in the range of about 300–800 microinches to enhance adhesion of the outer TBC coating.

As was mentioned above, use of a coating system that can be applied by APS has enabled assembly of an entire combustor assembly prior to application of a coating to selected surfaces of members facing a combustor interior. According to a method form of the present invention, a plurality of turbine engine combustor members, for example the members shown and described in connection with FIG. 1, was provided with uncoated body surfaces. Such members were assembled into a combustor prior to combustor assembly with associated and supporting structure such as outer and inner casings 16 and 20 and fuel stem 34. Surfaces selected to remain uncoated were masked using commercial masking materials such as plasma spray tape masking commonly used in the coating art. For example for coating of only deflector inner first faces 40 of the assembled deflector bodies, all surrounding member surfaces that can be exposed to coating deposition were masked. Then a coating system including two portions was applied to the deflector inner first surfaces 40 by an air spray method that applied each portion of the coating substantially concurrently in the same operation to all inner surfaces 40. In one example, NiCrAlY alloy was applied as an inner coating 54 to surface 40 by commercial APS. Thereafter, a ceramic-base TBC comprising zirconia stabilized with yttria was applied as an outer coating 56 to inner coating 54 by commercial APS.

In other embodiments of the present invention, a turbine engine combustor member, for example hollow center body 26, or combustor liners 14 and/or 18, in FIG. 1, or segments of such combustor liners, includes a member body made of the above-defined alloy and substantially uncoated. To enable the member to have durability and desired cycle life while operating substantially uncoated in the strenuous high temperature environment existing at the interior of a combustor, the member body includes therethrough a plurality of air cooling passages. In such embodiments, the combination of the alloy body with the defined properties in combination with cooling passages through the member body enables the member to survive and serve in the environment of a turbine engine combustor interior. One example of such passages is air-cooling holes 48 in FIG. 1, extending from a member body outer surface 58 to member body inner surface 60 exposed to the combustor interior 11.

The present invention has been described for illustration in connection with specific examples, embodiments, structures, materials and methods. However, it should be understood that they are intended to be typical and representative of rather than in any way limiting on the scope of the present invention. Those skilled in the various arts involved, for example relating to turbine engines and to metallic and non-metallic materials and coatings, will understand that the invention is capable of variations and modifications without departing from the scope of the appended claims.

What is claimed is:

1. A semiconductor device structure comprising:
    a gate electrode including a vertical sidewall and a gate dielectric covering the vertical sidewall;
    at least one semiconducting carbon nanotube extending vertically between opposite first and second ends at a location adjacent to said vertical sidewall of said gate electrode;
    a first contact electrically coupled with said first end of said at least one semiconducting carbon nanotube; and
    a second contact electrically coupled with said second end of said at least one semiconducting carbon nanotube.

2. The semiconductor device structure of claim 1 further comprising a catalyst pad electrically coupling said conductive carbon nanotube with said gate electrode, the catalyst pad participating in the synthesis of said conductive carbon nanotube.

3. The semiconductor device structure of claim 1 wherein said at least one semiconducting carbon nanotube is a single-wall semiconducting carbon nanotube.

4. The semiconductor device structure of claim 1 further comprising:
    a plurality of semiconducting carbon nanotubes extending vertically at a location adjacent to said vertical sidewall of said gate electrode.

5. The semiconductor device structure of claim 1 wherein said source includes a catalyst pad characterized by a catalyst material effective for growing said at least one semiconducting nanotube.

6. The semiconductor device structure of claim 5 wherein said first end of said at least one semiconducting carbon nanotube incorporates an electrical-conductivity enhancing substance diffused from said catalyst pad into said first end during fabrication.

7. The semiconductor device structure of claim 1 further comprising:
    an insulating layer disposed between said first contact and said gate electrode for electrically isolating said first contact from said gate electrode.

8. The semiconductor device structure of claim 1 further comprising:
    an insulating layer disposed between said second contact and said gate electrode for electrically isolating said second contact from said gate electrode.

9. The semiconductor device structure of claim 1 further comprising:
    a third contact and at least one conductive carbon nanotube electrically coupling said gate electrode with said third contact.

10. The semiconductor device structure of claim 1 wherein said second contact includes a vertically-extending metal post electrically coupled with said second end of said at least one semiconducting carbon nanotube.

11. The semiconductor device structure of claim 10 wherein said second contact includes a conductive layer extending horizontally beneath said gate electrode for coupling said catalyst pad with said metal post.

12. The semiconductor device structure of claim 1 wherein said second contact includes at least one vertically-extending conductive carbon nanotube electrically coupled with said second end of said at least one semiconducting carbon nanotube.

13. The semiconductor device structure of claim 12 wherein said second contact includes a conductive layer extending horizontally beneath said gate electrode for coupling said catalyst pad with said at least one vertically-extending conductive carbon nanotube.

14. A circuit comprising an interconnected plurality of semiconductor device structures of claim 1 arranged in an array characterized by a plurality of rows and a plurality of columns.

15. The circuit of claim 14 wherein said plurality of semiconductor devices are interconnected as a memory circuit.

16. The circuit of claim 15 further comprising:
    a plurality of word lines each electrically interconnecting said gate electrode of each of said plurality of semiconductor devices located in a corresponding one of said plurality of rows of said array; and a plurality of bit lines each electrically interconnecting said second contact of each of said plurality of semiconductor devices located in a corresponding one of said plurality of columns of said array.

17. The circuit of claim 16 wherein each of said plurality of word lines comprises said gate electrode of said plurality of semiconductor devices.

18. The circuit of claim 16 wherein each of said plurality of bit lines comprises a conductive stripe electrically coupling said source of each of said plurality of semiconductor devices located in a corresponding one of said plurality of rows of said array.

19. The circuit of claim 14 further comprising:
a substrate carrying said plurality of semiconductor devices and characterized by a surface area viewed vertical to the substrate, said plurality of semiconductor devices separated by an open space that ranges from about 20 percent to about 50 percent of said surface area.

20. The circuit of claim 14 wherein said plurality of semiconductor devices are interconnected as a logic circuit.

* * * * *

UNITED STATES PATENT AND TRADEMARK OFFICE
CERTIFICATE OF CORRECTION

| | |
|---|---|
| PATENT NO. | : 6,983,599 B2 |
| APPLICATION NO. | : 10/777567 |
| DATED | : January 10, 2006 |
| INVENTOR(S) | : Craig Young et al. |

It is certified that error appears in the above-identified patent and that said Letters Patent is hereby corrected as shown below:

Col. 7 line 57 - Col. 10 line 9;
Please replace claims 1-14 with the following claims 1-14:
1. A turbine engine combustor member at a combustor interior and including at least one surface exposed directly to combustion of fuel within the combustor interior comprising:
 a member body made of an alloy based on at least one element selected from the group consisting of Fe, Co, and Ni having an alloy high temperature operating capability within a temperature range of about 1300 - 2300° F, and properties comprising a combination of resistance to hot corrosion and to oxidation within the temperature range, the properties including:
 a) a hot corrosion resistance as defined and measured by a depth of attack on an alloy surface of less than about 0.01 inch, after exposure to about 2 parts per million sea salt in a gaseous medium, cycled in a temperature range of about 1500 -1700° F for about 1000 hours; and,
 b) an oxidation resistance as defined and measured by an alloy surface loss of less than 0.001 inch after cyclic testing for about 120 hours in an oxidizing gas stream at a velocity of about Mach 1 for about 20 cycles per hour from ambient to about 2150° F;
 the member body including a member body inner first surface exposed to the combustor interior and the combustion of fuel; and, a member body outer second surface not exposed directly to the combustor interior;
 the member body inner first surface including thereon a high temperature environmental resistant coating comprising a ceramic-base thermal barrier coating;
 the member body outer second surface being substantially uncoated.
2. The combustor member of claim 1 in which the coating is a coating system comprising an inner coating including Al on the member body inner first surface, and the ceramic-base thermal barrier coating is an outer coating on the inner coating.
3. The combustor member of claim 2 in which the inner coating comprises MCrAl in which M is at least one element selected from the group consisting of Fe, Co, and Ni.
4. The combustor member of claim 3 in which the inner coating comprises a plurality of layers including:
a first layer on the member body inner surface having a first microstructure of a first density in the range of about 90 – 100 % and a first surface roughness in the range of about 50 – 200 microinches; and,
a second layer on the first layer having a second microstructure of a second density in the range of about 60 – 90 % and a second surface roughness in the range of about 300 – 800 microinches.
5. The combustor of claim 2 in which the inner coating comprises PtAl.

UNITED STATES PATENT AND TRADEMARK OFFICE
CERTIFICATE OF CORRECTION

PATENT NO. : 6,983,599 B2
APPLICATION NO. : 10/777567
DATED : January 10, 2006
INVENTOR(S) : Craig Young et al.

It is certified that error appears in the above-identified patent and that said Letters Patent is hereby corrected as shown below:

Col. 7 line 57 - Col. 10 line 9 (cont'd);
6. The combustor member of claim 1 in which the alloy is a Ni base alloy comprising, in weight percent, from about 1 to about 3 rhenium, from about 6 to about 9 aluminum, from about 4 to about 6 tantalum, from about 12.5 to about 15 chromium, from about 3 to about 10 cobalt, and from about 2 to about 5 tungsten, with the balance essentially Ni and impurities.
7. The combustor member of claim 1 in which the member is selected from the group consisting of deflectors, splash plates, center bodies, swirlers and combustor liners.
8. A turbine engine combustor member at a combustor interior and including at least one surface exposed directly to combustion of fuel within the combustor interior comprising:
 a member body made of an alloy based on at least one element selected from the group consisting of Fe, Co, and Ni having an alloy high temperature operating capability within a temperature range of about 1300 - 2300° F, and properties comprising a combination of resistance to hot corrosion and to oxidation within the temperature range, the properties including:
 a) a hot corrosion resistance as defined and measured by a depth of attack on an alloy surface of less than about 0.01 inch, after exposure to about 2 parts per million sea salt in a gaseous medium, cycled in a temperature range of about 1500 - 1700° F for about 1000 hours; and,
b) an oxidation resistance as defined and measured by an alloy surface loss of less than 0.001 inch after cyclic testing for about 120 hours in an oxidizing gas stream at a velocity of about Mach 1 for about 20 cycles per hour from ambient to about 2150° F;
 the member body including a member body inner first surface exposed to the combustor interior and the combustion of fuel, and a member body outer second surface not exposed directly to the combustor interior;
 the member body including therethrough air cooling passages to pass cooling air from the member body outer second surface to the member body inner first surface;
 the member body inner and outer surfaces being substantially uncoated.
9. The combustor member of claim 8 in which the member body outer second surface defines at least in part a member hollow interior.
 10. The combustor member of claim 9 in which the member is selected from the group consisting of combustor center bodies and combustor liners.

UNITED STATES PATENT AND TRADEMARK OFFICE
CERTIFICATE OF CORRECTION

| | | |
|---|---|---|
| PATENT NO. | : 6,983,599 B2 | Page 3 of 4 |
| APPLICATION NO. | : 10/777567 | |
| DATED | : January 10, 2006 | |
| INVENTOR(S) | : Craig Young et al. | |

It is certified that error appears in the above-identified patent and that said Letters Patent is hereby corrected as shown below:

Col. 7 line 57 - Col. 10 line 9 (cont'd);

11. In a method for making a turbine engine combustor assembly, the steps of: providing a plurality of turbine engine combustor members for assembly at a combustor interior and including at least one surface exposed directly to combustion of fuel within the combustor interior, each member including a member body made of an alloy based on at least one element selected from the group consisting of Fe, Co, and Ni having an alloy high temperature operating capability within a temperature range of about 1300 – 2300° F, and properties comprising a combination of resistance to hot corrosion and to oxidation within the temperature range, the properties including:

a) a hot corrosion resistance as defined and measured by a depth of attack on an alloy surface of less than about 0.01 inch, after exposure to about 2 parts per million sea salt in a gaseous medium, cycled in a temperature range of about 1500 -1700° F for about 1000 hours; and, b) an oxidation resistance as defined and measured by an alloy surface loss of less than 0.001 inch after cyclic testing for about 120 hours in an oxidizing gas stream at a velocity of about Mach 1 for about 20 cycles per hour from ambient to about 2150° F;

the member body including a member body inner first surface for exposure to the combustor interior and the combustion of fuel, and a member body outer second surface not exposed directly to the combustor interior, the member body inner and outer surfaces being substantially uncoated;

assembling the plurality of members into a combustor with the inner first surfaces exposed to the combustor interior;

applying to the assembled inner first surfaces a high temperature environmental resistant coating using an air spray coating method that coats all of the assembled inner first surfaces substantially concurrently.

12. The method of claim 11 in which applying the high temperature coating comprises a plurality of steps including:

applying an inner coating including Al disposed on the member body inner first surfaces; and then, applying a ceramic-base thermal barrier coating on the inner coating.

13. The method of claim 12 in which the inner coating comprises MCrAl in which M is at least one element selected from the group consisting of Fe, Co, and Ni and the ceramic base coating is zirconia stabilized with yttria.

UNITED STATES PATENT AND TRADEMARK OFFICE
CERTIFICATE OF CORRECTION

PATENT NO. : 6,983,599 B2
APPLICATION NO. : 10/777567
DATED : January 10, 2006
INVENTOR(S) : Craig Young et al.

It is certified that error appears in the above-identified patent and that said Letters Patent is hereby corrected as shown below:

Col. 7 line 57 - Col. 10 line 9 (cont'd);
14. The method of claim 13 in which the inner coating comprises a plurality of layers including:
a first layer on the member body inner surface having a first microstructure of a first density in the range of about 90 –100 % and a first surface roughness in the range of about 50 – 200 microinches; and,
a second layer on the first layer having a second microstructure of a second density in the range of about 60 – 90 % and a second surface roughness in the range of about 300 – 800 microinches.

Signed and Sealed this

Twentieth Day of November, 2007

JON W. DUDAS
*Director of the United States Patent and Trademark Office*